United States Patent [19]

Wakabayashi et al.

[11] Patent Number: 5,505,981
[45] Date of Patent: Apr. 9, 1996

[54] METHOD FOR IMPARTING ABILITY OF PREVENTING OBESITY AND IMPAIRED GLUCOSE TOLERANCE TO FOODS AND FOODS AND SUGAR PREPARATIONS EXHIBITING SUCH PREVENTIVE EFFECTS

[75] Inventors: Shigeru Wakabayashi, Takarazuka; Yasuhiro Hoshii, Fujiidera, both of Japan

[73] Assignee: Matsutani Chemical Industries Co., Ltd., Hyogo, Japan

[21] Appl. No.: 101,011

[22] Filed: Aug. 3, 1993

[30] Foreign Application Priority Data

Aug. 7, 1992 [JP] Japan .................................. 4-232719

[51] Int. Cl.⁶ .................................................. A23L 1/09
[52] U.S. Cl. ........................ 426/658; 426/660; 426/804
[58] Field of Search .................................. 426/658, 660, 426/804, 548

[56] References Cited

U.S. PATENT DOCUMENTS 3,642,535  2/1972  Graham et al. .
3,928,135  12/1975  Milner ........................... 424/180
5,236,719  8/1993  Meyers ........................... 426/658

FOREIGN PATENT DOCUMENTS 0368451    5/1990   European Pat. Off. .
443789     8/1991   European Pat. Off. .
0477089    3/1992   European Pat. Off. .
0540421    5/1993   European Pat. Off. .
2243997    4/1975   France .
1-200828   8/1989   Japan .
2-276556   11/1990  Japan .
WO9209208  6/1992   WIPO .

*Primary Examiner*—Jeanette Hunter
*Attorney, Agent, or Firm*—Sughrue, Mion, Zinn, Macpeak & Seas

[57] ABSTRACT

Preventing obesity and impaired glucose tolerance by incorporating indigestible dextrin containing at least 30% by weight of indigestible components into a food in an amount ranging from 1 g to 30 g per meal of the food.

4 Claims, 3 Drawing Sheets

METHOD FOR IMPARTING ABILITY OF PREVENTING OBESITY AND IMPAIRED GLUCOSE TOLERANCE TO FOODS AND FOODS AND SUGAR PREPARATIONS EXHIBITING SUCH PREVENTIVE EFFECTS

BACKGROUND OF THE INVENTION

The present invention relates to a method for imparting an ability of preventing obesity and impaired glucose tolerance to foods, and a food and a sugar preparation exhibiting such preventive effects.

Recently, eating habits have been improved, but the population of patients suffering from geriatric diseases represented by obesity and diabetes increases steadily because of hypernutrition and unbalanced diet as well as lack of exercise. Under such social background, there have been developed various agents for inhibiting an increase in the blood-sugar level and excess insulin-secretion for preventing healthy person from suffering from obesity and/or diabetes or for treating patients requiring the control of the blood-sugar level such as those suffering from diabetes. As such agents, there have been known, for instance, Acarbose (available from Bayer Yakuhin, Ltd.) and AO-128 (available from Takeda Chemical Industries, Ltd.) which are substances having an effect of inhibiting the gastrointestinal absorption of sugar and starch and inhibitors for enzymes involved in digestion, but both of them are medicines and the ingestion or intake thereof for the preventive purpose becomes a cause of various problems. For instance, they suffer from a problem of safety, since they would be dangerous because of possible side-effects. Moreover, polymers of glucose moieties bonded through $\alpha$-1,6-bonds such as isomaltotriose, dextran and pullulan have been known to have an effect of inhibiting an increase in the blood-sugar level in response to ingestion of sugar. Isomaltotriose and dextran as such are digested and absorbed and, in particular, dextran suffers from a problem of safety since it has been proved that dextran exhibits side-effects such as an effect of elongating the blood-coagulation time. On the other hand, pullulan can inhibit any increase in the blood-sugar level after the ingestion of sugar, but is substantially ineffective for the control of the blood-sugar level after the ingestion of glucose and maltose. Moreover, the effect thereof for controlling the insulin-secretion has not yet been proved. Furthermore, pullulan has been known to control an increase in the body weight when it is administered to a young rat and to inhibit the growth thereof.

On the other hand, the effect of insulin is very important for controlling the sugar-metabolism in patients suffering from diabetes, persons whose probability of suffering from diabetes is high or patients suffering from obesity and, therefore, it is needed for these persons or patients to protect, hold and/or enhance the effect of insulin. There have been used, for instance, solutions for transfusion and foods containing monosaccharides or sugar alcohols such as fructose, sorbitol and xylitol; disaccharides and their alcohols such as maltitol, maltose and leucrose; and glucose polymers (U.S. Pat. No. 3,928,135), capable of being digested in and absorbed by living bodies independent of the effect of insulin, for the prevention of temporal hyperglycemia after the ingestion of these sugars, for saving the insulin-secretion, for the supplementation of energy or for controlling the osmotic pressure of transfusion solutions. However, these mono- and poly-saccharides and their alcohols have high degrees of sweetness, but the quality of sweetness thereof is inferior to that of sugar. In addition, sugar alcohols often becomes a cause of diarrhea. Moreover, it has been known that the glucose polymers do not stimulate any insulin-secretion when it is used in the form of a transfusion solution, but the transfusion is a medical act and cannot be commonly adopted.

Some dextrins have also been used for the same purpose explained above and examples thereof include pyrodextrin, white dextrin and yellow dextrin. The pyrodextrin is generally prepared by heating a starch having a moisture content of several percentage in the presence or absence of an acid. The conditions for heating are a temperature ranging from 135° to 218° C. and a heating time ranging from 10 to 20 hours for British Gum which is obtained by roasting without using any acid. On the other hand, the white dextrin is prepared through the heat-treatment performed at a temperature ranging from 79° to 121° C. for 3 to 8 hours in the presence of an acid. Further the yellow dextrin is likewise prepared through the heat-treatment performed at a temperature ranging from 150° to 220° C. for 6 to 18 hours in the presence of an acid.

Sugar preparations are in general prepared by mixing sugar with other ingredients, but when the sugar preparations are subjected to domestic use in the form of table sugar like sugar for home use, various problems arise. For instance, they have poor flow properties, aggregated into massive coarse particles due to moisture absorption. In addition, they are separated into individual ingredients upon being packaged in a container and thus become non-uniform since the particle size and specific gravity of sugar differ from those of other ingredients used.

SUMMARY OF THE INVENTION

The present invention has been developed to solve the foregoing problems associated with the conventional techniques and accordingly, an object of the present invention is to provide a method for imparting an ability of preventing obesity and impaired glucose tolerance to foods. The prevention of obesity and impaired glucose tolerance can be ensured through inhibition of increases in the blood-sugar level and insulin-secretion in response to the oral ingestion of sugary substances such as sugars and starches.

Another object of the present invention is to provide a food having an ability of preventing obesity and impaired of glucose tolerance, which can be administered with safety.

A further object of the present invention is to provide a sugar preparation which exhibits such preventive effects, which is excellent in flow properties and storability, which can be used in food industries and which can easily, domestically be handled.

The inventors of this invention have found out that indigestible dextrin shows an effect of controlling the intestinal function, an effect of improving serum lipids and an effect of inhibiting insulin-secretion in response to glucose-stimulation and that the indigestible dextrin does not have any adverse effect on the increase in the blood-sugar level in response to glucose-stimulation. Further the inventors of this invention have now conducted various studies on the influence of the indigestible dextrin on the ingestion of saccharides spreading from disaccharides to polysaccharides included in foods in large amounts to thus solve the foregoing problems. As a result, the inventors have found out that the indigestible dextrin is excellent in the effect of inhibiting any increase in the blood-sugar level in consequence of sugar ingestion. In addition, the inventors have elucidated that the effect of the indigestible dextrin relies on the inhibition of the absorption of glucose produced through digestion (or hydrolysis) of these saccharides spreading from disaccharides to polysaccharides (inclusive of sugar) and inhibition of gastrointestinal secretion of glucagon which has an effect of stimulating insulin-secretion and accordingly makes the insulin secretion slow. Moreover, the indigestible dextrin does not suffer from the problem of toxicity as is proved by acute toxicity test, subacute toxicity test and mutagenicity test and it has been ingested as a safe food over a long time period.

Besides, the physico-chemical properties thereof are stable to any pH change and heat, does not react with other ingredients for foods and, therefore, can satisfactorily withstand cooking processes and various steps for food processing. The present invention utilizes such indigestible dextrin exhibiting the foregoing characteristic properties for the purpose of preventing obesity and impaired glucose tolerance caused in consequence to saccharide-intake.

Moreover, the inventors have conducted intensive studies, have found out that the indigestible dextrin is excellent in taste and texture and permits the relaxation of the increase in the blood-sugar level as will be discussed in detail below and that the taste and texture of food peculiar thereto is rarely impaired through the use of this indigestible dextrin as an ingredient for foods and thus have completed the present invention.

The foregoing objects of the present invention can effectively be accomplished by developing an indigestible dextrin most suitably used as an agent for inhibiting increases in the blood-sugar level and the insulin-secretion, by incorporation of the indigestible dextrin into foods, or by coating sugar particles with the dextrin to give a sugar preparation having improved flow properties and storability, on the basis of the studies on the relation between the indigestible dextrin and the taste thereof, and the effects thereof on the human physiological functions.

According to an aspect of the present invention, there is provided a method for imparting an ability of preventing obesity and impaired glucose tolerance to foods which comprises incorporating indigestible dextrin containing at least 30% by weight of indigestible components into a food in an amount ranging from 1 g to 30 g per meal of the food.

According to another aspect of the present invention, there is provided a food having an ability of preventing obesity and impaired glucose tolerance which comprises the indigestible dextrin containing at least 30% by weight of indigestible components, in an amount ranging from 1 g to 30 g per meal of the food.

According to a further aspect of the present invention, there is provided a sugar preparation having an ability of preventing obesity and impaired glucose tolerance which comprises sugar particles coated with the indigestible dextrin containing at least 30% by weight of indigestible components.

DESCRIPTION OF THE PREFERRED EMBODIMENTS

Figure 1:
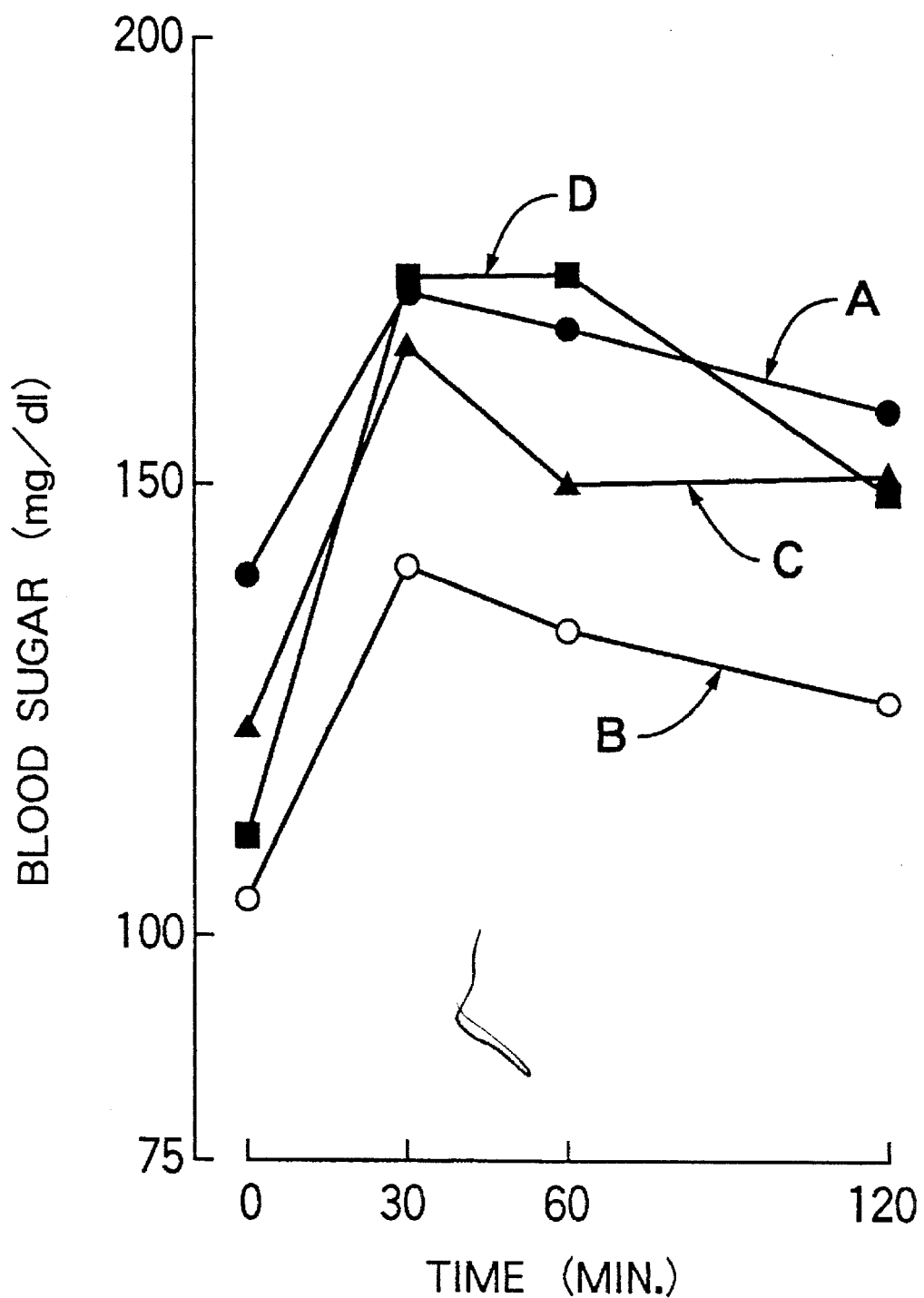
FIG. 1 shows the results of the oral glucose administration test carried out in Example 3 for blood-sugar level.

The method, food and sugar preparation according to the present invention will hereunder be described in more detail.

The term "food" herein used means all foods into which the indigestible dextrin of the present invention can be incorporated so that the food containing the indigestible dextrin shows the ability of preventing obesity and impaired glucose tolerance. Examples of such foods include those containing no sugar, those containing a relatively small amount of sugar and those containing a relatively large amount of sugar, for example, drinks such as juice, coffee, tea; Japanese confectionery such as bean paste, bean-jam wafer, rice cake stuffed with bean-jam, bun stuffed with bean-jam; Western confectionery such as sponge cake, sable, chocolate, doughnuts, cake, pie, custard pudding; ice cream; bread; jam, marmalade; etc. In the preferred embodiment of the present invention, the indigestible dextrin is contained in a food in an amount of 10 to 40% by weight based on the weight of sugar contained in the food.

The term "indigestible dextrin" herein used means dextrin which is prepared by heating a starch in the form of powder in the presence of a small amount of an inorganic acid to give pyrodextrin followed by hydrolysis of the pyrodextrin with $\alpha$-amylase and optional treatment such as glucoamylase treatment, ion-exchange resin chromatography and purification and which contains at least 30% by weight of indigestible components as determined by the method explained later.

The indigestible dextrins effectively used in the present invention are, for instance, those prepared by the following methods.

(1) A product having a content of indigestible components ranging from about 30 to 60% by weight obtained by adding a small amount of an inorganic acid, preferably hydrochloric acid to a starting starch, heating the mixture in the form of powder to give pyrodextrin followed by hydrolysis of the pyrodextrin with $\alpha$-amylase and optional purification.

(2) A product having a content of indigestible components ranging from about 30 to 60% by weight obtained by hydrolyzing the product prepared in the process (1) discussed above with glucoamylase and optionally refining the hydrolyzed product.

(3) A product obtained by further subjecting the product prepared in the process (2) discussed above to separation and removal of the glucose fraction through ion-exchange chromatography to thus increase the content of indigestible components up to about 60 to 90% by weight.

Examples of starches used as starting materials for the indigestible dextrin include corn starch, waxy corn starch, potato starch, tapioca starch, sweet potato starch, wheat starch, barley starch and rice starch. The method for the preparation of the indigestible dextrin will further be detailed below.

(A) In the method (1), a pyrodextrin is first prepared. The pyrodextrin is a product obtained by adding several % (3 to 10% by weight) of an about 1% aqueous solution of hydrochloric acid to a starch and then hydrolyzing the mixture while heating it. The starch should be uniformly mixed with the acid aqueous solution added thereto prior to the heat-treatment. These starch and acid are stirred in a mixer to form a uniform mixture and aged for 1 to 5 hours. After the aging, preferably the mixture is pre-dried at a temperature ranging from 100° to 120° C. until the moisture content of the mixture is reduced to 5% by weight or less. Then, the mixture is heat-treated at a temperature ranging from 150° to 200° C. for 10 to 120 minutes, preferably 30 to 120 minutes [these conditions for the heat-treatment differ from those for the aforementioned dextrins (white dextrin and yellow dextrin) heated in the presence of acids]. In this respect, the higher the temperature during the heat-treatment, the higher the content of indigestible components in the resulting product. However, the amount of colored substances in the product increases if the heating temperature exceeds about 180° C. Thus, the reaction temperature more preferably ranges from 150° to 180° C.

Alternatively, it is also possible to carry out the reaction at an elevated temperature for a short period of time by properly selecting a heating apparatus to be used. For instance, the mixture can more efficiently be heat-treated in an apparatus such as an extruder which permits a uniform reaction of the mixture within a very short time. In case of large-scale production, the conditions for heat-treatment must sometimes be changed since the treatment is a reaction of a powdery mixture. In this case, it is desirable to appropriately modify the heating conditions while intermittently monitoring the quality of the mixture during the heat-treatment.

The pyrodextrin thus prepared is dissolved in water to give an aqueous solution having a concentration ranging from about 20 to 45% by weight, then the pH of the aqueous solution of the pyrodextrin is controlled to a level of 5.5 to 6.5 and α-amylase is added to the solution. If Termamyl 60L (available from Novo Nordisk Bioindustry Company) is used as an α-amylase, it is added to the solution in an amount ranging from 0.05 to 0.2% by weight on the basis of the amount of the pyrodextrin. Other α-amylases can likewise be used in an amount adjusted in such a manner that the activity of each individual α-amylase selected is approximately identical to that of Termamyl 60L. After the addition of an α-amylase, the solution is hydrolyzed by maintaining it at a working-temperature of α-amylase ranging from 85° to 100° C., which varies depending on the kinds of α-amylases used, over 30 minutes to 2 hours. Then the temperature is raised up to about 120° C. (inactivation temperature for the α-amylases) to inactivate the α-amylase. Alternatively, the inactivation of the α-amylase may be carried out by addition of an acid such as hydrochloric acid or oxalic acid to reduce the pH of the solution to a level of not more than the inactivation pH for the α-amylase, i.e., on the order of about 4. After the hydrolysis with the α-amylase, the hydrolyzed solution may be autoclaved at a temperature of 115° to 135° C. and again treated with α-amylase for the improvement of the filtration rate for the solution during purification.

If the solution is refined after the hydrolysis with α-amylase, active carbon is added thereto for the removal of any impurities and colored substances present therein. Then the solution is filtered through a filter usually used such as filter press or precoat filter. Further the filtrate is passed through a layer of an ion-exchange resin for the removal of salts and colored substances included therein. In the treatment with an ion-exchange resin, the filtrate is usually passed through a cation-exchange resin layer, an anion-exchange resin layer and then a mixed ion-exchange resin layer.

(B) In the foregoing method (2), the solution obtained after the α-amylase treatment in the foregoing method (1) is subjected to a treatment with glucoamylase. In general, the glucoamylase preparations commonly used comprise a small amount of α-amylase. For this reason, the pyrodextrin may directly be treated with such a glucoamylase preparation to achieve approximately the same hydrolysis effect as that achieved through the treatments with α-amylase and then with glucoamylase, but if the content of α-amylase in the glucoamylase preparation is low, the hydrolysis effect accomplished by such a direct treatment of the pyrodextrin with the glucoamylase preparation is slightly inferior to that achieved by the method of the present invention. Therefore, it is most preferred to treat the pyrodextrin with α-amylase and then with glucoamylase.

This treatment with glucoamylase can be carried out under the conditions commonly used in the glucoamylase treatment. For instance, the temperature of the solution is reduced to a level on the order of 55° to 60° C., the pH thereof is adjusted to about 4.0 to 6.0, a commercially available glucoamylase preparation is then added to the solution in an amount ranging from 0.05 to 0.2% by weight on the basis of the amount of the original pyrodextrin and the solution is maintained at the foregoing temperature for about 24 to 48 hours for the hydrolysis of the dextrin. The digestible components such as oligosaccharides present in the solution are decomposed into glucose during the reaction. The amount of glucoamylase used is not limited to the range defined above and may be adjusted depending on the activity of the glucoamylase preparation used. The time required for the glucoamylase treatment is likewise not limited to the range defined above and can arbitrarily be adjusted by controlling the amount of the glucoamylase preparation used. Subsequently, the hydrolysis with glucoamylase is terminated by, for instance, heating the solution up to about 80° C. to thus-inactivate the enzyme. Thereafter, the solution is optionally refined by the same manner used in the foregoing method (1). The indigestible dextrin prepared by this preparation method (2) comprises about 50% by weight of glucose in addition to indigestible components.

(C) In the foregoing preparation method (3), the solution obtained after the glucoamylase treatment in the method (2) is further subjected to discoloration and filtration and then refined by passing through an ion-exchange resin layer. Thereafter, the resulting solution is treated by chromatography which makes use of an ion-exchange resin to separate and remove a glucose containing-fraction and to thus increase the content of the indigestible components present in the solution. In this case, a commercially available strongly acidic cation-exchange resin can be used as the ion-exchange resin for the separation of the glucose fraction. Specific examples thereof preferably include Amberlite IR-116, Amberlite IR-118, Amberlite IR-120B, Amberlite XT-1022E and Amberlite XT-471F (Trade Names; all of these are available from Organo Company); Diaion 2K-1B, Diaion SKK-102, Diaion SK-104, Diaion SK-106, Diaion SK-110, Diaion SK-112, Diaion SK-116 and Diaion FR-01 (Trade Names; all of these are available from Mitsubishi Chemical Industries, Ltd.); and XFS-43281.00, XFS-43280.00, XFS-43279.00 and XFS-43278.00 (Trade Names; all of these are available from Dow Chemical Japan Co.).

In general, these resins are preferably converted into alkali metal- or alkaline earth metal-forms prior to practical use. The flow rate of the solution passed through the column packed with the resin is preferably controlled depending on the kinds of resins used in order to improve the separation efficiency of high molecular weight dextrin from glucose and in general the value SV (space velocity) ranges from 0.1 to 0.6 and preferably 0.2 to 0.4. If the value of SV is not within the range defined above, the operating efficiency and the separation efficiency are sometimes impaired. The temperature during passing the solution through the column ranges from about 20° to 70° C. and preferably 50° to 70° C. If the temperature is less than the lower limit, the separation efficiency is lowered and the viscosity of the solution increases. The resin is often damaged due to such an increase in the viscosity, while if the temperature exceeds the upper limit, the solution causes browning and other properties of the solution may sometimes be impaired.

The content of the indigestible components can be reduced to not less than about 60% by weight, preferably not less than about 80% by weight and the content of glucose can likewise be reduced to about 0.5% by weight through this separation treatment, but the latter can arbitrarily be controlled by properly adjusting the conditions for the separation. Thus, if it is intended to use glucose as an ingredient of a food, a indigestible dextrin preparation having a high glucose content can also be prepared. For instance, if the product obtained after the glucoamylase treatment has a glucose content of 50% by weight, a half thereof (i.e., 25% by weight) can be removed to give a product having an overall glucose content of about 33% by weight. However, it should be noted that the use of a product having an excessively high glucose content results in the formation of a sugar preparation having high hygroscopicity and poor storability.

In the present invention, the indigestible components in the indigestible dextrin show the effect of preventing obesity and impaired glucose tolerance. The indigestible dextrin having a content of the indigestible components of not less than about 30% by weight can be effectively used in the present invention. However, the amount of the indigestible dextrin to be ingested can be reduced as the content of indigestible components increases. For this reason, the content is preferably not less than 40% by weight and more preferably not less than 50% by weight and may be 100% by weight.

The present invention also provides a food which comprises the indigestible dextrin and which has accordingly an ability of preventing obesity and impaired glucose tolerance. According to the present invention, the intended effect of preventing obesity and impaired glucose tolerance can satisfactorily be ensured through ingestion of the indigestible dextrin in an amount generally ranging from 1 g to 30 g/meal. However, there is a difference in the magnitude of the effect of the dextrin on the physiological functions among individuals and, therefore, the optimum amount thereof is most preferably adjusted while taking the practical effect thereof on individuals into consideration.

The present invention further provides a sugar preparation which comprises sugar particles coated with the indigestible dextrin containing at least 30% by weight of the indigestible components. The amount of the indigestible dextrin to be added to the sugar preparation is not limited to a specific range so far as the addition thereof does not impair the quality of the counterpart of the preparation, i.e., sugar, but the amount thereof preferably ranges from about 5 to 100 parts, preferably about 10 to 40 parts by weight per 100 parts by weight of sugar. In this case, the optimum amount thereof is likewise most preferably adjusted while taking the practical effect thereof on individuals into consideration because of a difference in the magnitude of the effect of the indigestible components on the physiological functions among individuals.

Regarding sugars used as an essential ingredient of the sugar preparation, soft sugar commonly used has poor flow properties and it is difficult to coat the surface thereof with the indigestible dextrin. Therefore, granulated sugar and powdered sugar are preferably used in the invention.

The term "relaxation of increase in the blood-sugar level" herein used means the fact that, in the glucose tolerance test, the blood-sugar level observed at each instance of the measurement reaches a significantly low value within a relatively short time period (up to about 60 minutes) after the ingestion of each corresponding dextrin as compared with the results observed for other sugars. For instance, in an experiment using rats, the blood-sugar levels observed at 30 and 60 minutes after the oral administration of sugar were 165 and 135 mg/dl respectively, while those observed at 30 and 60 minutes after the oral administration of the indigestible dextrin in addition to sugar were 133 and 113 mg/dl respectively. This clearly indicates that the administration of the indigestible dextrin results in a significantly low blood-sugar level ($p<0.05$).

The group (A) of blood-sugar levels observed on the rats to which sugar is administered and the group (B) of blood-sugar levels observed on the rats to which the indigestible dextrin in addition to sugar is administered show so-called t distributions which are slightly heavy tailed ones as compared with the normal distribution. If only not more than 5% of the distribution curves representing the blood-sugar levels of these two groups overlap, the risk rate (p) is defined to be $<0.05$ (5%) and it can be concluded that there is a significant difference between these groups in a risk rate (p) of $<0.05$ (5%). The probability of 5% seems to be very low from the viewpoint of statistics and, therefore, the foregoing result clearly indicates that the indigestible dextrin slowly increases the blood-sugar level as compared with sugar.

In the acute toxicity test wherein the indigestible dextrin was orally administered to rats, the mortality was zero. The $LD_{50}$ of the indigestible dextrin can be estimated to be not less than the highest dose used in this test, i.e., not less than 40 g/Kg (body weight) which is not less than 1.55 times that of D-glucose [25.8 g/Kg (body weight)]. In addition, the indigestible dextrin showed negative response to the mutagenicity test.

As has been discussed above in detail, the indigestible dextrin and the sugar preparation of the present invention have very high safety and it is believed that they do not have any upper limit in the amount of ingestion per day like D-glucose. Moreover, the amount thereof to be ingested through the oral route is naturally restricted by various factors such as easiness of handling and taste and texture of each particular product, but the optimum results can be achieved through the use of the indigestible dextrin preparations of the present invention, in particular, those treated through enzyme hydrolysis, since high molecular weight saccharides are sufficiently decomposed. They are, accordingly, free of pasty taste and texture and they have low viscosities approximately identical to that of sugar. Moreover, the degree of sweetness thereof is low because of the low content of low molecular weight saccharides. Thus, the indigestible dextrin of the present invention can be ingested in a large amount per meal or per day.

The sugar preparation of the present invention can be prepared by coating the surface of sugar particles with the indigestible dextrin detailed above. The coating operation can be performed in a granulating machine commonly used. Most preferably, the surface of sugar particles are coated with a solution containing the indigestible dextrin while fluidizing the sugar particles in a fluidized bed granulating machine since the resulting coated product is excellent in solubility.

The term "granulation" means a technique for producing particles having approximately uniform shape and size starting from ingredients in the form of powder, granules, massive forms or solutions. Among these techniques, the fluidized bed granulation technique comprises blowing hot air through the bottom of a layer of solid particles to blow up and fluidize the particles within the space over the layer and spraying a binder solution or a coating solution on these fluidized particles to thus perform granulation and coating. Commercially available fluidized bed granulating machines are in general apparatuses having closed structures and capable of performing, therein, a series of operations: mixing, granulation, coating, drying and cooling operations. These apparatuses permit arbitrary control of the particle size of the resulting product, the achievement of very high speeds of granulation and coating operations, elimination of any deterioration of the starting ingredients and stable production of porous granulated and coated product. The temperature of the hot air used may widely vary, but it generally ranges from 60° to 100° C. and good results can be obtained. Moreover, the concentration of the coating solution in general ranges from 5 to 25% and preferably on the order of about 15% by weight.

Further the sugar preparation of the present invention preferably has flowability values ranging from 50 to 70 as determined by a powder tester. The term "flowability value" herein used will be defined below in Example 9.

The indigestible dextrin used in the invention shows various physiological effects such as an effect of controlling the intestinal function, an effect of improving serum lipids and an effect of inhibiting the insulin-secretion in response to sugar-intake. Therefore, the foods and the sugar preparations of the present invention ensure the prevention of obesity and impaired glucose tolerance. In addition, the indigestible dextrin is non-toxic as proved by acute and subacute toxicity tests as well as mutagenicity test and does not impair the taste and texture peculiar to other various ingredients. Therefore, the indigestible dextrin can safely be used in various kinds of foods and sugar preparations for home use.

The present invention will hereinafter be described in more detail with reference to the following non-limitative working Examples and the safety and functions of the indigestible dextrin of the invention will also be discussed in detail with reference to comparative examples.

EXAMPLE

In the following Examples, the content of the indigestible components was determined by the method disclosed in "Quantitative Analysis of Indigestible Components" (DENPUN KAGAKU (Starch Science), (1990), Vol 37, No. 2, p. 107) which were slightly modified.

The modified method comprises accurately weighing 1 g of a sample and adding 50 ml of a 0.05 M phosphate buffer (pH 6. 0) and then 0.1 ml of α-amylase (Termamyl 120L, the activity of 120 KNU/g; available from Novo Nordisk Bio-industries, Ltd.) to the sample to react them at 90° C. for 30 minutes. After cooling the reaction system, the pH thereof is adjusted to 4.5, then 0.1 ml of amyloglucosidase (No. A-3042, the activity of 6100 units/ml; available from Sigma Company) is added to the reaction system, the reaction is continued at 60° C. for 30 minutes and the system is heated to 90° C. to terminate the reaction. After completion of the reaction, the reaction solution is filled up to 100 ml with water and subjected to the determination of the content of glucose present therein by the pyranose oxidase method and thus the content of the indigestible components (%) is calculated from the resulting glucose content (B) and that of the sample (A), separately determined in the same manner, prior to the reaction according to the following equation:

The content of indigestible components (% by weight): $[1-A-(B-A)\times 0.93]\times 100$ wherein A is glucose content (g) determined prior to the reaction and B is glucose content (g) determined after the reaction.

Example 1

Pinefiber C (trade name of a powdery indigestible dextrin available from Matsutani Chemical Industries, Ltd. and prepared from a potato starch by the foregoing method (3) and had a content of indigestible components of 86.7% by weight) was used in the following animal test.

In this test, 45 rats were used. These rats exhibited, on the average, a blood-sugar level and an amount of secreted insulin of 80.0 mg/dl and 10.5 μU/ml respectively as determined during fasting or starvation. When sugar was orally administered to these rats in a dose of 1.5 g per unit body weight (Kg), these animals exhibited increases in the blood-sugar level and the amount of secreted insulin which reached, 30 minutes after the administration, the maxima, i.e., 165 mg/dl and 50.2 μU/ml on the average, respectively and 120 minutes after the administration they were reduced to the normal levels.

Separately, the foregoing indigestible dextrin was added to 1.5 g of sugar in various rates ranging from 1/20 to 1/1, then each mixture was administered to rats through oral route and the cumulative blood-sugar level, the cumulative amount of secreted insulin over 120 minutes after the administration were determined and the data obtained were compared with those observed when only sugar was administered to estimate relative amounts or levels while assuming the level and amount observed when sugar was administered alone to be 100 respectively. The results thus obtained are summarized in the following Table 1. These data of the blood-sugar level and the amount of secreted insulin were collectively evaluated to determine the relative inhibitory effect of each particular sample and the results thus obtained were also listed in Table 1 in terms of symbols (+) and (−).

TABLE 1

| Added Amount (g) | 0 | 0.075 | 0.15 | 0.06 | 1.50 |
|---|---|---|---|---|---|
| Content of Hardly Digestible Components (g) | 0 | 0.065 | 0.13 | 0.52 | 1.30 |
| Blood-Sugar Level (%) | 100 | 89.5 | 66.6 | 71.5 | 81.6 |
| Amount of Secreted Insulin (%) | 100 | 55.1 | 38.9 | 55.5 | 52.8 |
| Inhibitory Effect | − | + | +++ | ++ | ++ |

−: No effect, +: effective, ++: highly effective, +++: very highly effective

The data listed in Table 1 clearly indicate that increases in the blood-sugar level and the amount of secreted insulin were significantly inhibited through the administration of the indigestible dextrin of the present invention. The inhibitory effect of the indigestible dextrin was significant when it was used in an amount ranging from 0.065 to 1.3 g as expressed in terms of the amount of the indigestible components per 1.5 g of sugar, but the effect achieved through addition of 1.3 g of the indigestible components was not markedly improved as compared with the effect observed when 0.52 g of the indigestible components was added. Therefore, the amount of the indigestible components to be added more preferably ranges from 0.13 to 0.52 g per 1.5 g of sugar, i.e., the desired inhibitory effect can be expected if the dextrin is used in an amount ranging from about 5 g to about 100 g and more preferably about 10 to 40 g per 100 g of sugar.

Moreover, a commercially available edible white dextrin was likewise added to sugar in an amount of 0.15 g per 1.5 g of sugar and the resulting mixture was orally administered to rats in the same manner used above and 30 minutes after the administration, the blood-sugar level was determined. As a result, the blood-sugar level was found to be 160 mg/dl on the average which was approximately identical to that observed when sugar was administered alone through oral route.

Example 2

Rats (36 animals in all; averaged body weight 126 g; averaged fat content 20 g; averaged body/fat ratio: (amount of fats/body weight)×100:15.8%) were separated into 4 groups. The rats of Group 1 were supplied with a feed having a high sugar content (65% by weight) and the rats of each of Groups 2 to 4 were supplied with a synthetic feed which comprised 95 parts by weight of the feed having a high sugar content and 5 parts by weight of the indigestible dextrin of Example 1, pectin (isolated from lemons, available from Wako Pure Chemical Industries, Ltd.) or Cornfiber (available from Nihon Shokuhin Kako Co.) for 4 weeks to breed the animals. These animals could freely take the feed and drinking water (tap water) during the breeding. After 4 weeks, the body weight, the fat content and the body/fat ratio of each animal were determined and it was found that there was no difference in the feed efficiency (increment in body weight/amount of feed intake) between these 4 groups. The results thus obtained are listed in the following Table 2.

TABLE 2

|  | No. of Animals | Body Weight (g) | Fat Content (g) | Body/Fat Ratio (%) |
| --- | --- | --- | --- | --- |
| Rat (Group 1)[1] | 12 | 407 | 112 | 27.6 |
| Rat (Group 2)[2] | 8 | 408 | 68 | 16.6 |
| Rat (Group 3)[3] | 8 | 441 | 117 | 26.5 |
| Rat (Group 4)[4] | 8 | 416 | 113 | 27.3 |

[1] Rats of Group 1 were supplied with a feed having a high sugar content.
[2] Rats of Group 2 were supplied with a synthetic feed which comprised the feed having a high sugar content and the indigestible dextrin.
[3] Rats of Group 3 were supplied with a synthetic feed which comprised the feed having a high sugar content and pectin.
[4] Rats of Group 4 were supplied with a synthetic feed which comprised the feed having a high sugar content and Cornfiber.

As seen from the results listed in Table 2, the inhibitory effects of pectin and Cornfiber were not obvious, while the indigestible dextrin did not affect the body weights (or growth) of the rats of Group 2 as compared with the rats of Group 1 to which a feed having a high sugar content was fed, but resulted in distinct decreases in the fat content and the body/fat ratio. These results clearly indicate that the indigestible dextrin of the present invention is substantially effective for the prevention of obesity.

Example 3

Rats (36 animals in all; averaged body weight 126 g; averaged fat content 20 g; averaged body/fat ratio: (amount of fats/body weight)×100:15.8%) were separated into 4 groups. The rats of Group A were supplied with a feed having a high sugar content (65%) and the rats of each of Groups B, C and D were supplied with a synthetic feed which comprised 95 parts by weight of the feed having a high sugar content and 5 parts by weight of the indigestible dextrin of Example 1, pectin (isolated from lemons, available from Wako Pure Chemical Industries, Ltd.) or Cornfiber (available from Nihon Shokuhin Kako Co.) for 4 weeks to breed the animals. These animals could freely take the feed and drinking water (tap water) during the breeding. After 4 weeks, these animals were used in a test wherein glucose (1.5 g/kg body weight) was administered through oral route while restricting the feed and water intake. The blood was collected from each animal, during fasting or starvation, 30, 60 and 120 minutes after the administration of glucose to determine the blood-sugar level and the secreted insulin concentration. In respect of the samples collected during fasting or starvation, the fructosamine content in the fasting plasma sample was determined. It has been known that the fructosamine content of the plasma is closely correlated with the averaged blood-sugar level as determined 2 weeks before the blood collection and is thus an effective means for evaluating the degree of impaired glucose tolerance in addition to the glucose administration test. The results thus obtained for blood-sugar level, insulin concentration and fructosamine content in plasma are plotted on the attached FIGS. 1 to 3, repectively. In these figures, the following symbols are used.

- ●: Rats of Group A to which a feed having a high sugar content was administered.
- ○: Rats of Group B to which a synthetic feed comprising a feed having a high sugar content and the indigestible dextrin of the invention was administered.
- ▲: Rats of Group C to which a synthetic feed comprising a feed having a high sugar content and pectin was administered.
- ■: Rats of Group D to which a synthetic feed comprising a feed having a high sugar content and Cornfiber was administered.

Figure 2:
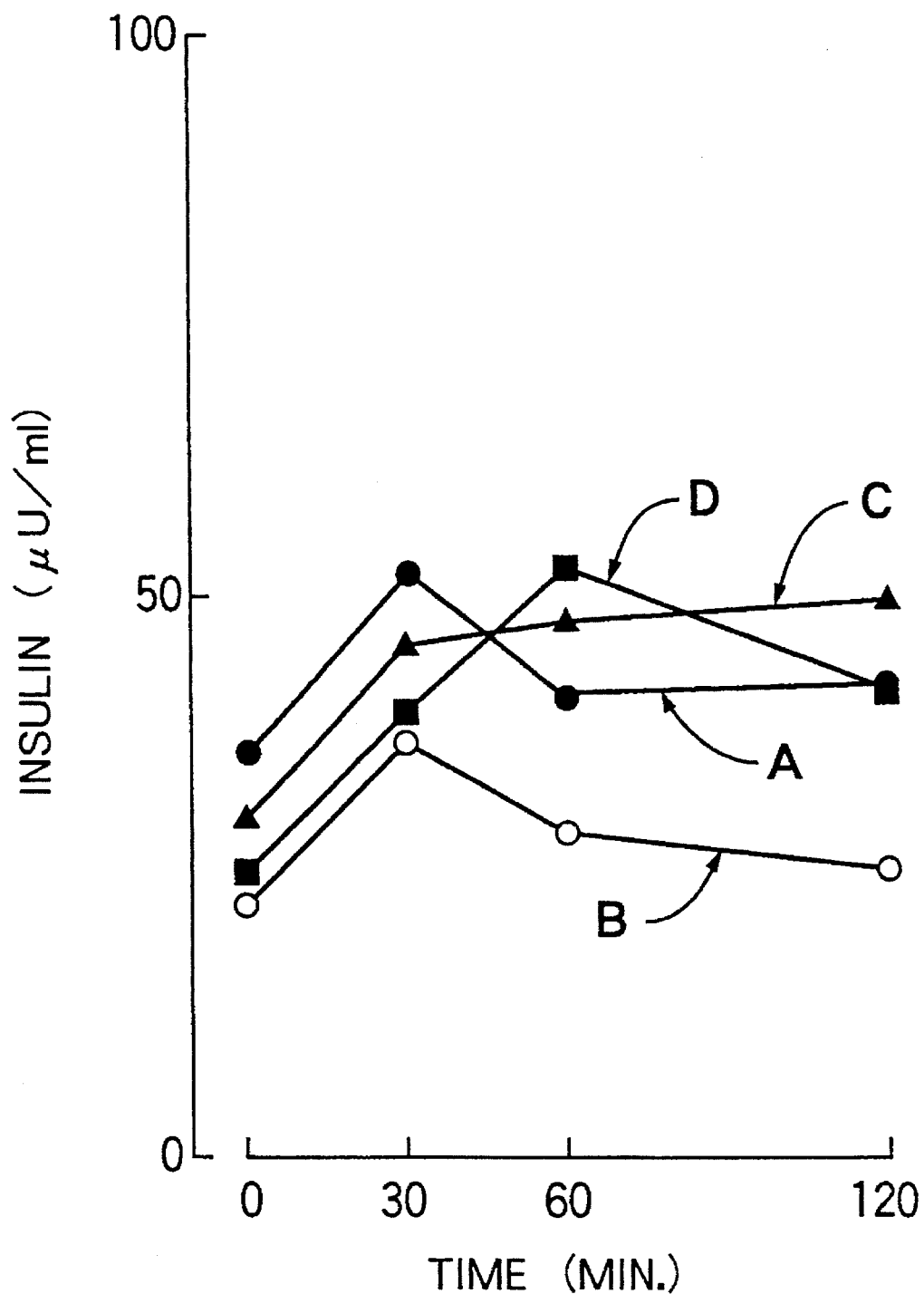
FIG. 2 shows the results of the oral glucose administration test carried out in Example 3 for insulin concentration.
Figure 3:
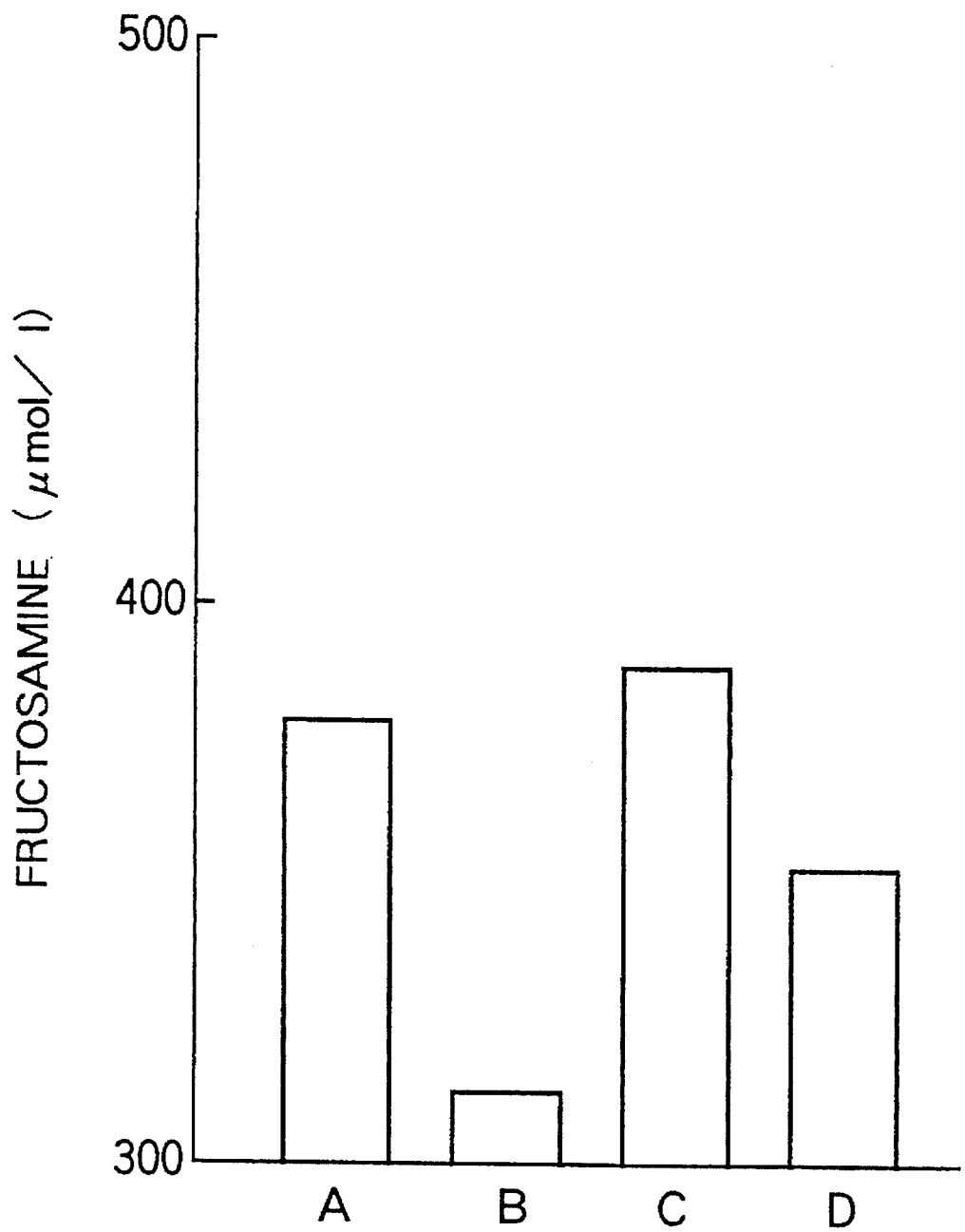
FIG. 3 shows the results of the oral glucose administration test carried out in Example 3 for fasted fructosamine concentration in plasma.

As seen from the results shown in FIGS. 1 to 3, the rats of Group A to which a feed having a high sugar content was administered had, during fasting or starvation, a high blood-sugar level on the order of 140 mg/dl on the average; the blood-sugar level reached, 30 minutes after the administration, its maximum (170 mg/dl on the average) and thereafter was as a whole maintained at a high level which was on the order of about 1.2 times that observed during fasting or starvation even 120 minutes after the administration. In case of the rats of Group B to which a synthetic feed comprising a feed having a high sugar content and the indigestible dextrin of the invention was administered, on the contrary, the blood-sugar level during fasting was equal to the normal level, the blood-sugar curve observed for Group B was distinctly held at a low level and the fructosamine content in the plasma was also low. On the other hand, the degree of abnormality of glucose tolerance was not relaxed at all through the administration of pectin or Cornfiber (in case of the rats of Groups C and D). Insulin concentration was the lowest in the rats of Group B of the present invention.

Example 4

There was introduced 4 kg of commercially available granulated sugar particles (Granulated Sugar MGF available from Higashi:Nippon Sugar Mfg. Co., Ltd.) into a small-sized fluidized bed granulating machine (Model 20L available from Ookawara Works Co., Ltd.) and 3.2 Kg of a 25% solution of the indigestible dextrin prepared in Example 1 was sprayed, at a rate of 50 g/min, on the granulated sugar particles suspended and fluidized by blowing hot air maintained at 65° C. through the sugar layer to thus granulate the particles. After spraying the total amount of the indigestible dextrin, the sugar particles thus granulated were dried till the temperature thereof reached 55° C., cooled by blowing a cold air of 25° C. till the temperature thereof reached 40° C. to complete the granulation and drying operations and to give an experimental sample of the sugar preparation of the invention whose mixing weight ratio: sugar/indigestible dextrin was 100:20.

Separately, a control sample was prepared by mixing granulated sugar and the indigestible dextrin prepared in Example 1 in a mixing weight ratio of 100:20. Then 100 g each of the experimental sample and the control sample was introduced into a 500 ml volume wide-mouthed bottle, then each bottle was closed, vertically shaken manually over 20 times, 10 g each of test samples (6 test samples in all) were collected from the upper, middle and lower portions of each sample contained in the bottle to quantitatively analyze the test sample for the presence of reducing sugars according to the Willstatter-Schudel's method and to thus calculate the content of the indigestible dextrin present in each test sample. The results are listed in the following Table 3 in terms of values relative to the result concerning granulated sugar which is assumed to be 100.

TABLE 3

| Sampling Portion | Content of the Hardly digestible Dextrin | | |
|---|---|---|---|
| | Upper | Middle | Lower |
| Sugar Preparation of Example 4 | 20.3 | 19.8 | 20.1 |
| Control Sample | 8.3 | 18.6 | 31.3 |

The results listed in Table 3 indicate that the sugar preparation of the present invention has a uniform composition irrespective of the sampling portions in the bottle and that the composition of the simple mixture as the control sample greatly varies depending on the sampling portions. This means that the indigestible dextrin included in the control sample moved towards the lower portion of the bottle during handling the control sample and accordingly, this made the control sample non-uniform.

Example 5

There was introduced, into an weighing can of aluminum, 5 g each of the sugar preparation and the control sample immediately after mixing which were the same as those used in Example 4, followed by allowing to stand in a hygrostatic desiccator maintained at a relative humidity of 81% and a temperature of 20° C. over 96 hours and thereafter the condition of each powdery sample was inspected. The results thus obtained clearly indicate that the sugar preparation did not include any massive coarse particles formed through agglomeration, while the particles of the control sample caused blocking and were not fluidized even when the container was slanted. This fact indicates that the control sample has poor storability.

Example 6

Pinefiber C (trade name of a powdery indigestible dextrin available from Matsutani Chemical Industries, Ltd. and prepared from potato starch as a starting material by the method (3) discussed above) having a content of indigestible components of 87.7% by weight was used in the following experiments.

The indigestible dextrin (10 g) dissolved in 100 ml of water was administered to 5 male persons and 5 female persons, whose BMI [body weight(kg)/(height(m))$^2$: obesity index] was not less than 30, three times a day before meals over four weeks, without changing the eating habits, the life-style and the quantity of motion throughout the duration of the indigestible dextrin-intake and then changes observed in the body weights and the blood-sugar levels of these persons during fasting or starvation were determined.

As a result, it was observed that the body weight, was reduced (by 2.4 kg on the average) in all of the subjects examined as compared with that determined prior to the test. Moreover, the averaged blood-sugar level during fasting or starvation was found to be 115 mg/dl, but four weeks after the initiation of the test, it was reduced down to 98 mg/dl. These results indicate that the indigestible dextrin of the present invention exhibits excellent glucose tolerance.

Example 7

There was introduced 2 kg of commercially available granulated sugar particles (Granulated Sugar MGF available from Higashi-Nippon Sugar Mfg. Co., Ltd.) into the same bed fluidized granulating machine used in Example 4 and 400 g of a 25% solution of the indigestible dextrin prepared in Example 1 was sprayed, at a rate of about 30 g/min, on the granulated sugar particles suspended and fluidized by blowing hot air maintained at 70° C. through the sugar layer to thus granulate the particles. After spraying the total amount of the indigestible dextrin, the sugar particles thus granulated were dried till the temperature thereof reached 50° C. to complete the granulation and drying operations and to give a sugar preparation 1. Separately, the same procedures used above were repeated except that 400 g of a 50% solution of the indigestible dextrin was sprayed on the granulated sugar particles in the suspended and fluidized condition to give a sugar preparation 2.

The mixing weight ratio of sugar to the indigestible dextrin was 100:5 for the sugar Preparation 1 and 100:10 for the sugar preparation 2 respectively (or about 100:4 and about 100:9 respectively when the amount of the indigestible dextrin was expressed in terms of the amount of the indigestible components present in the dextrin).

Then the sugar preparations containing the indigestible dextrin were orally administered to 10 healthy male persons to determine the effect of the dextrin. The averaged blood-sugar level of these male persons was 76.5 mg/dl during fasting or starvation prior to the test, but the averaged blood-sugar level was increased up to 145 mg/dl when determined 30 minutes after administering an aqueous sugar solution prepared by dissolving 100 g of sugar in 150 ml of water and the averaged amount of secreted insulin was also determined and was found to be 48.3 μU/ml. On the contrary, they were significantly reduced to levels of 120 mg/dl and 32 μU/ml respectively when determined 30 minutes after administering a solution comprising 105 g of the sugar preparation 1 dissolved in 150 ml of water. Moreover, they were also significantly reduced to levels of 110 mg/dl and 25 μU/ml respectively when determined 30 minutes after administering a solution comprising 110 g of the sugar preparation 1 dissolved in 150 ml of water.

Example 8

An indigestible dextrin-containing fraction was obtained by treating Pinefiber L (the trade name of a indigestible liquid dextrin available from Matsutani Chemical Industry Co., Ltd. and prepared by the method (2) discussed above using, as a starting material, potato starch) with an ion-exchange resin to separate and remove about 63% by weight of glucose present therein. Then the fraction was concentrated to give a indigestible liquid dextrin having a concentration of 70% by weight, a content of indigestible components of 69.8% by weight and a glucose content of 15.8% by weight based on the total solid content. The resulting indigestible dextrin was then used in the following test.

There was introduced 4 kg of commercially available powdered sugar (available from Aritomo Shoten Co., Ltd.) into the same fluidized bed granulating machine used in Example 4 and 600 g of a 30% solution of the indigestible liquid dextrin prepared above was sprayed, at a rate of 65 g/min, on the powder sugar suspended and fluidized by blowing hot air maintained at 70° C. through the sugar layer to thus granulate the sugar. After spraying the total amount of the indigestible dextrin, the sugar particles thus granulated were dried till the temperature thereof reached 50° C. to give a sugar preparation 3.

Properties, i.e., angle of repose, aerated bulk density, packed bulk density and angle of spatula of the powdery sugar preparations 2 and 3 were determined by Powder Tester (an apparatus for determining properties, of powder, Mode 1 PT-E available from Hosokawa Micron Co., Ltd.) and compressibility was calculated according to the following equation: Compressibility=100 ×/(packed bulk density)−(aerated bulk density)]/(packed bulk density)

Then, each index was determined from each resulting numerical value on the basis of the following Table 4 (the extract from Chemical Engineering, Jan., 1965, 18, pp. 163–168) and the sum of the indices were defined to be "flowability value". The relation between the flowability value and the practical flowability was determined (calculated by the inventors of this invention in the light of the disclosure included in the article: Chemical Engineering, Jan., 1965, 18, pp. 163–168). The results are listed in the following Table 5.

TABLE 4

| Angle of Repose | | Compressibility | | Angle of Spatula | |
|---|---|---|---|---|---|
| Deg. | Index | % | Index | Deg. | Index |
| <25 | 25 | <5 | 25 | <25 | 25 |
| 26–29 | 24 | 6–9 | 23 | 26–30 | 23 |
| 30 | 22.5 | 10 | 22.5 | 31 | 22.5 |
| 31 | 22 | 11 | 22 | 32 | 22 |
| 32–34 | 21 | 12–14 | 21 | 33–37 | 21 |
| 35 | 20 | 15 | 20 | 38 | 20 |
| 36 | 19.5 | 16 | 19.5 | 39 | 19.5 |
| 37–39 | 18 | 17–19 | 18 | 40–44 | 18 |
| 40 | 17.5 | 20 | 17.5 | 45 | 17.5 |
| 41 | 17 | 21 | 17 | 46 | 17 |
| 42–44 | 16 | 22–24 | 16 | 47–59 | 16 |
| 45 | 15 | 25 | 15 | 60 | 15 |
| 46 | 14.5 | 26 | 14.5 | 61 | 14.5 |
| 47–54 | 12 | 27–30 | 12 | 62–74 | 12 |
| 55 | 10 | 31 | 10 | 75 | 10 |
| 56 | 9.5 | 32 | 9.5 | 76 | 9.5 |
| 57–64 | 7 | 33–36 | 7 | 77–89 | 7 |
| 65 | 5 | 37 | 5 | 90 | 5 |
| 66 | 4.5 | 38 | 4.5 | 91 | 4.5 |
| 67–89 | 2 | 39–45 | 2 | 92–99 | 2 |
| 90 | 0 | >45 | 0 | >99 | 0 |

TABLE 5

| Flowability value | Degree of Flowability |
|---|---|
| 65–75 | Excellent |
| 60–64 | Good |
| 52–59 | Fair |
| 45–51 | Passable |
| 30–44 | Poor |
| 15–29 | Very Poor |
| 0–14 | Very very poor |

Table 6 given below shows the properties of the sugar preparations determined above in comparison with the data observed for granulated sugar. In Table 6, the numerical values given in parentheses represent indices.

TABLE 6

| | Sample | | |
|---|---|---|---|
| Property Determined | Granulated Sugar | Sugar Preparation 2 | Sugar Preparation 3 |
| Angle of Repose | 39 (18.0) | 36 (19.5) | 37 (15.0) |
| Aerated Bulk Density | 0.853 | 0.679 | 0.513 |
| Packed Bulk Density | 0.958 | 0.718 | 0.596 |
| Compressibility | 10.9 (22.0) | 5.4 (25.0) | 15.9 (19.5) |
| Angle of Spatula | 57 (16.0) | 47 (16.0) | 48 (16.0) |
| Flowability Value | 56.0 | 60.5 | 53.5 |

The results listed in Table 6 indicate that both of these two sugar preparations examined have fair to good flowability.

Example 9

Fibersol 2E (the trade name of an indigestible dextrin powder having a content of indigestible components of 90.7% by weight available from Matsutani Chemical Industry Co., Ltd. and prepared from corn starch by the method (1) discussed above in which the heat-treatment was performed with a twin-screw extruder) was used in the following experiments.

An orange juice (200 ml) having the composition listed in Table 7 was orally administered to 10 healthy male persons whose blood-sugar level during fasting or starvation had been 80.5 mg/dl, on the average, prior to the test. The averaged blood-sugar level of these male persons was increased up to 146 mg/dl when determined 30 minutes after the administration and the averaged amount of secreted insulin was also determined and was found to be 52.3 μU/ml. On the contrary, they were significantly reduced to levels of 121 mg/dl and 33 μU/ml respectively when determined 30 minutes after administering the foregoing orange juice to which 3 g of the indigestible dextrin was supplemented. Moreover, they were also significantly reduced to levels of 118 and 112 mg/dl and 25 and 23 μU/ml respectively when determined 30 minutes after administering the foregoing orange juice to which 10 g or 30 g (corresponding to about 9 g or about 27 g respectively when expressed in terms of the amount of the indigestible components) of the indigestible dextrin was supplemented.

TABLE 7

| Composition of Orange Juice | |
|---|---|
| Component | Amount Incorporated |
| Concentrated Orange Juice (Bx. 45°) | 13.4 |
| Granulated Sugar | 16.2 |

TABLE 7-continued

Composition of Orange Juice

| Component | Amount Incorporated |
|---|---|
| Citric Acid | 0.6 |
| Sodium Citrate | 0.2 |
| Orange Flavour | 0.6 |
| Water | 169.0 |

Example 10 Soft bean paste

The following components were used to prepare soft bean paste. Agar powder was added to water, heated and dissolved therein. Sugar and indigestible dextrin were added, dissolved and boiled. Bean jam was added, mixed and boiled down to obtain soft bean paste (100 g/meal).

| Component | Amount (parts by weight) |
|---|---|
| Bean jam | 30 |
| Sugar | 30 |
| Agar powder | 0.36 |
| Water | 30.64 |
| Indigestible dextrin of Example 1 | 6 |

Example 11 Sponge cake

The following components were used to prepare a sponge cake. The white of the egg was whipped and the other components were added to prepare a dough. The dough was divided and baked in an oven at 180° C. for 50 minutes to obtain a sponge cake (80 g/meal).

| Component | Amount (parts by weight) |
|---|---|
| Sugar | 20 |
| Indigestible dextrin of Example 1 | 15 |
| Egg | 35 |
| Wheat flour | 20 |
| Thick molt syrup | 7 |
| Water | 3 |

Example 12 Chocolate

The following components were used to prepare chocolate. Bitter chocolate and cocoa butter were melted into which all the components other than lecithin were kneaded and then refined with a roller mill. Lecithin was added and tempered to obtain chocolate (50 g/meal).

| Component | Amount (parts by weight) |
|---|---|
| Powdery sugar | 35 |
| Indigestible dextrin of Example 1 | 15 |
| Bitter chocolate | 20 |
| Cocoa butter | 15 |
| Powdery milk | 14.7 |
| Lecithin | 0.3 |

Example 13 Sponge cake

The following components were mixed, whipped, placed in a mold and baked in an oven at 180° C. for 30 minutes to obtain sponge cake (80 g/meal).

| Component | Amount (parts by weight) |
|---|---|
| Wheat flour | 28 |
| Egg | 28 |
| Sugar | 20 |
| Indigestible dextrin of Example 8 | 17.4 |
| Emulsifier | 1.3 |
| Water | 5.3 |

Example 14 Pudding

The following components were used to prepare pudding. Sugar and indigestible dextrin were dissolved in water. Milk and flavor were added, stirred and baked in an oven at 160° C. for 30 minutes to obtain pudding (80 g/meal).

| Component | Amount (parts by weight) |
|---|---|
| Milk | 68.4 |
| Egg | 10 |
| Sugar | 10 |
| Indigestible dextrin of Example 8 | 11.4 |
| Emulsifier | 1.3 |
| Flavor | a small amount |

Example 15 Ice cream

The following components were mixed, heated to 80° C. to be dissolved and homogenized. Then, the mixture was aged for 24 hours and rapidly cooled to −40° C. to obtain ice cream (100 g/meal).

| Component | Amount (parts by weight) |
|---|---|
| Raw cream | 8.4 |
| Butter | 4.2 |
| Condensed milk (sugar content: 44.2%) | 19.2 |
| Skim milk | 2.3 |
| Sugar | 2.5 |
| Indigestible dextrin of Example 1 | 5 |
| Emulsion stabilizer | 0.7 |
| Vanilla flavor | 0.1 |
| Water | 57.6 |

Example 16 Strawberry jam

The following components were mixed and heated to 82° C. while crushing strawberry and boiled down in a pan to obtain strawberry jam (20 g/meal).

| Component | Amount (parts by weight) |
|---|---|
| Fresh strawberry | 40 |
| Sugar | 30 |
| Indigestible dextrin of Example 8 | 25 |
| Pectin | 1 |
| Citric acid | 0.3 |
| Water | 3.7 |

What is claimed is:

1. A sugar preparation suitable for use in preventing obesity and impaired glucose tolerance which comprises granulated or powdered sugar particles coated with an indigestible dextrin containing at least 30% by weight of indigestible components, and wherein the mixing weight ratio of the sugar to the indigestible dextrin is from about 100:10 to about 100:40.

2. The sugar preparation of claim 1 wherein it has a flowability value of from 50 to 60.

3. The sugar preparation according to claim 1, wherein the mixing ratio of the sugar to the indigestible dextrin is from about 100:20 to about 100:40.

4. The sugar preparation according to claim 1, wherein the coated sugar particles are prepared by coating the surface of sugar particles with a solution containing the indigestible dextrin while fluidizing the sugar particles in a fluidized bed granulating machine.

* * * * *